United States Patent
Su et al.

(10) Patent No.: US 7,362,326 B2
(45) Date of Patent: *Apr. 22, 2008

(54) DETERMINING THE CONVEX HULL OF CONVEX POLYGONS WITH CONGRUENT CORRESPONDING ANGLES

(75) Inventors: Philip Ti-Fei Su, Redmond, WA (US); Richard J Swaney, Sammamish, WA (US); Matthew P Rhoten, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/669,731

(22) Filed: Jan. 31, 2007

(65) Prior Publication Data

US 2007/0139407 A1   Jun. 21, 2007

Related U.S. Application Data

(63) Continuation of application No. 10/438,635, filed on May 14, 2003, now Pat. No. 7,187,378.

(51) Int. Cl.
  *G06T 15/00* (2006.01)
(52) U.S. Cl. ..................... 345/419; 345/420; 715/863
(58) Field of Classification Search ..................... None
  See application file for complete search history.

(56) References Cited

U.S. PATENT DOCUMENTS 5,155,813 A  10/1992  Donoghue et al.
5,434,959 A  7/1995  Von Ehr, II et al.
5,548,705 A  8/1996  Moran et al.
5,596,692 A  1/1997  Martin et al.
6,628,279 B1  9/2003  Schell et al.
7,246,321 B2 *  7/2007  Bryborn et al. .............. 715/741

OTHER PUBLICATIONS

O. Bouattane et al., "A Fast Parallel Algorithm for Convex Hull Problem of Multi-Leveled Images," Journal of Intelligent and Robotic Systems, 33: 285-299, 2002.
Z.Q. Wang et al., "An Optimal Real Time Algorithm for Determine the Convex Hull of a Set of Points in a Plane," Computer ind. Engng, vol. 35, Nos. 1-2 pp. 331-334, 1998.
J. Yamamoto, "Convex_Hull—A Pascal Program for Determining the Convex Hull for Planar Sets," Computers & Geosciences, vol. 23, No. 7, pp. 725-738, 1997.

(Continued)

*Primary Examiner*—Ulka Chauhan
*Assistant Examiner*—Daniel F Hajnik
(74) *Attorney, Agent, or Firm*—Banner & Witcoff, Ltd.

(57) ABSTRACT

The convex hull of two polygons having congruent corresponding angles with the same orientation can be determined by analyzing the relationship of each vertex of one of the polygons relative to its adjacent vertices. More particularly a line may be defined between a selected vertex on one of the polygons and its corresponding vertex on the other polygon. If the vertices adjacent to the selected vertex both fall on the same side of the line, then a line connecting the selected vertex with its corresponding vertex lies on the convex hull of the two polygons. If, on the other hand, the vertices adjacent to the selected vertex are located on different sides of the line, then the line connecting the selected vertex with its corresponding vertex does not lie on the convex hull.

6 Claims, 9 Drawing Sheets

OTHER PUBLICATIONS

Guohua Cui et al., "A Clas of Optimal Algorithms for Determine the Convex Hull of a Set of Nodes in a Plane," J. Computers, vol. 20, No. 4, Apr. 1997.

D. Rutovitz, "Efficient Processing of 2-D Images," Medical Research Council, Edinburgh, pp. 229-253, 1990.

Z. Hussain, "A fast approximation to a convex hull," Pattern Recognition Letters 8, pp. 289-294, Dec. 1988.

R. Miller et al., "Computational Geometry on a Mesh-Connected Computer," IEEE, pp. 66-73, 1984.

D. Avis, "On the Complexity of Finding the Convex Hull of a Set of Points," Discrete Applied Mathematics 4, pp. 81-86, 1982.

A. Yao, "A Lower Bound to Finding Convex Hulls," Journal of the Association for Computing Machinery, vol. 28, No. 4, Oct. 1981, pp. 780-787.

S. Akl, "Two Remarks on a Convex Hull Algorithm," Information Processing Letters, vol. 8, No. 2, Feb. 1979, pp. 108-109.

R.A. Jarvis, "On the Identification of the Convex Hull of a Finite Set of Points in the Plane," Information Processing Letters 2, pp. 18-21, 1973.

H. Lee et al., "Determining in Linear Time the Minimum Area Convex Hull of Two Polygons," IIE Transactions, vol. 20, No. 4, pp. 338-345, Dec. 1988.

R. Miller et al., "Efficient Parallel Convex Hull Algorithms," IEEE Transactions on Computers, vol. 37, No. 12, pp. 1605-1618, Dec. 1988.

R. Miller et al., "Mesh Computer Algorithms for Computational Geometry," IEEE Transactions on Computers, vol. 38, No. 3, pp. 321-340, Mar. 1989.

J. Erickson, "New Lower Bounds for Convex Hull Problems in Odd Dimensions," IEE, pp. 1-16, 1999.

M. Ikhsan et al., "Automatic Generation of Haptic Aspect for a Polyhedron Via its Convex Hull," IEE, pp. 548-551, 1996.

Preparata et al., "Convex Hull of Finite Sets of Points in Two and Three Dimensions", Communications of the ACM archive, vol. 20, Issue 2 (Feb. 1977), pp. 87-93.

Cheng et al., "Space-Efficient Ray-Shooting and Intersection Searching: Algorithms, Dynamization, and Applications" Symposium on Discrete Algorithms archive, Proceedings of the second annual ACM-SIAM symposium on Discrete Algorithms, Pub 1991, pp. 7-16.

* cited by examiner

DETERMINING THE CONVEX HULL OF CONVEX POLYGONS WITH CONGRUENT CORRESPONDING ANGLES

This is a continuation of U.S. application Ser. No. 10/438,635, filed May 14, 2003, now U.S. Pat. No. 7,187,378, which is incorporated by reference in its entirety herein.

FIELD OF THE INVENTION

Various aspects of the present invention relate to the determination of the convex hulls of two convex polygons having congruent corresponding angles that are oriented in the same direction. Various aspects of the present invention are particularly applicable to the determination of the convex hull of two rectangles in order to, for example, render electronic ink between the rectangles.

BACKGROUND OF THE INVENTION

A "convex hull" is the set of points forming the smallest convex set that includes all of the points. Thus, the convex hull of two polygons is the smallest single convex polygon that encloses the two polygons. It is often useful in the field of computer science to obtain the convex hull of two polygons as quickly and efficiently as possible. For example, electronic ink may be rendered based upon a collection of sample points made with a stylus. If the electronic ink is intended to simulate the appearance of ink written with a chisel-tipped pen, then each of the sample points has a rectangular shape. Further, while the proportions of the rectangle for each sample point may be the same, the actual size of each rectangle may vary if the ink is created using a stylus and digitizer sensitive to pressure and angle differences in how the stylus is held. To accurately render the ink between two sample points, the sample points must be connected by lines that fully encompass the rectangle for each sample point. Thus, the rendered ink between two sample points is the convex hull encompassing the two rectangles making up the sample points.

As well as being useful for rendering electronic ink, a convex hull can also be used for other purposes in the field of computer science. For example, determining the convex hull of polygons is useful in rendering complex figures composed of convex polygons, such as in computer video games and other graphically-intensive applications. Similarly, a method for determining the convex hull of convex polygons can be used for tasks including collision detection between complex figures and determining whether one of the two polygons completely contains the other. In addition, there are a variety of other applications for techniques to determine the convex hull of two convex polygons.

While various techniques have been developed to calculate the convex hull of two polygons, these techniques are laborious and require a number of operations on the order of $O(N 1nN)$, where N is the number of vertices in each polygon. To render ink smoothly and in synchronism with the movement of the stylus, however, the ink must be generated and rendered very quickly. Accordingly, various aspects of the invention are directed to techniques for determining the convex hull of two polygons having congruent corresponding angles more quickly and efficiently than conventional techniques. Advantageously, various examples of the invention allow the convex hull to be determined using a number of operations on the order of $O(N)$, rather than $O(N 1nN)$ as with conventional techniques.

BRIEF SUMMARY OF THE INVENTION

According to various aspects of the invention, the convex hull of two convex polygons having corresponding congruent angles with the same orientation can be determined by analyzing the relationship of each vertex of one of the polygons relative to its adjacent vertices. More particularly, for some examples of the invention, a line is defined between a selected vertex on one of the polygons and its corresponding vertex on the other polygon. If the vertices adjacent to the selected vertex both fall on the same side of the line, then that line lies on the convex hull of the two polygons. If, on the other hand, the vertices adjacent to the selected vertex are located on different sides of the line, then the line does not lie on the convex hull.

Typically, two lines are determined to lie on the convex hull of two convex polygons. These lines, together with the opposite sides of the polygons connected by the lines, form the convex hull for the two convex polygons. If no lines are determined to lie on the convex hull, then one of the polygons encloses the other entirely. With this arrangement, the outer polygon forms the convex hull of the two polygons. Alternately, three or more lines may be determined to lie on the convex hull, indicating that multiple vertices of each polygon are located on a single line forming the convex hull. If this occurs, two of the lines are selected, and the remaining lines are ignored. For example, when four lines passing through adjacent vertices are determined to lie on the convex hull, the first line is designated as a part of the convex hull, and the next line determined to lie on the convex hull (that is, the line terminating at the adjacent vertex) is ignored. Similarly, the third line determined to lie on the convex hull is designated as a part of the convex hull, and the fourth line determined to lie on the convex hull is ignored.

Various examples of the invention may use an even simpler technique to determine the convex hull of two rectangles oriented in the same direction. According to these aspects of the invention, the Cartesian coordinates of a selected vertex of one of the rectangles is compared with the Cartesian coordinates of the corresponding vertex of the other rectangle. More particularly, the difference in the x-coordinate values of the corresponding vertices is determined, together with the difference in the y-coordinate values of the corresponding vertices. If the selected vertex has the highest or lowest x-coordinate and y-coordinate values, and the differences have different sign values, then a line between the selected vertex and its corresponding vertex lies on the convex hull. If however, the differences have the same sign values, then a line between the vertices will not lie on the convex hull of the rectangles.

On the other hand, if the selected vertex does not have the highest x-coordinate and y-coordinate values or the lowest x-coordinate and y-coordinate values, and the coordinate value differences have the same sign values, then a line between the selected vertex and its corresponding vertex lies on the convex hull. If however, the x-coordinate and y-coordinate differences for this selected vertex have different sign values, then a line between the vertices will not lie on the convex hull of the two rectangles.

DETAILED DESCRIPTION OF THE DRAWINGS

Overview

As will be discussed in detail below, various embodiments of the invention provide a fast and efficient method for determining the convex hull between two convex polygons having congruent corresponding angles with the same orientation. Accordingly, an example environment in which different embodiments of the invention can be implemented will first be discussed. Also, in order to facilitate a better understanding of the invention, different geometric concepts, such as convex polygons, congruent corresponding angles and convex hulls will be discussed. Various embodiments of the invention for determining the convex hull of different polygons will then be described as well.

Example Operating Environment

Various techniques for determining the convex hull of convex polygons with congruent corresponding angles having the same orientation according to different embodiments of the invention may be implemented using software. That is, a tool for determining the convex hull of two convex polygons with congruent corresponding angles having the same orientation may be described in the general context of computer-executable instructions, such as program modules, executed by one or more computing devices. Generally, program modules include routines, programs, objects, components, data structures, etc. that each may perform particular tasks or implement particular abstract data types. Typically the functionality of the program modules may be combined or distributed as desired in various embodiments.

Figure 1:
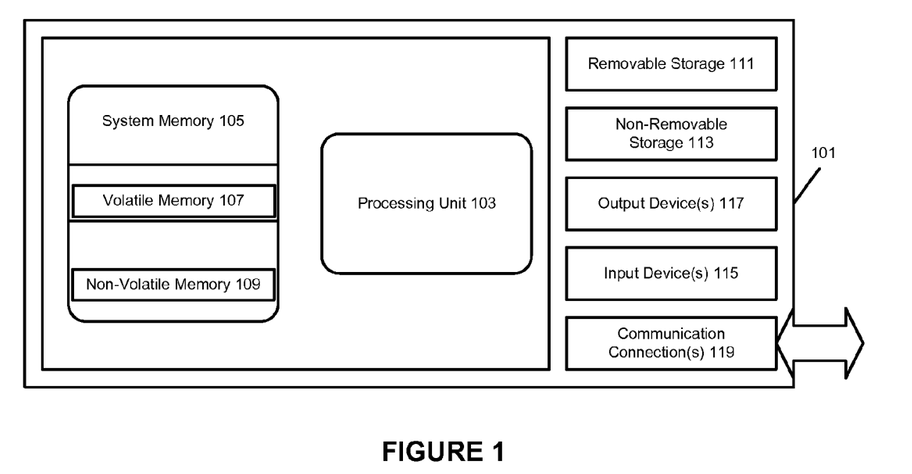
FIG. 1 shows an example of an operating environment by which various examples of the invention may be implemented.

Because various embodiments of the invention may be implemented using software, it may be helpful for a better understanding of the invention to briefly discuss the components and operation of a typical programmable computer on which some embodiments of the invention may be implemented. Accordingly, FIG. 1 illustrates an example of a computing device 101 that provides a suitable operating environment by which various embodiments of the invention may be implemented. This operating environment is only one example of a suitable operating environment, however, and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing device 101 typically includes at least some form of computer readable media. Computer readable media can be any available media that can be accessed by the computing device 101. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, punched media, holographic storage, or any other medium which can be used to store the desired information and which can be accessed by the operating environment 101.

Communication media typically embodies computer readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

With reference to FIG. 1, in its most basic configuration the computing device 101 typically includes a processing unit 103 and system memory 105. Depending on the exact configuration and type of computing device 101, the system memory 105 may include volatile memory 107 (such as RAM), non-volatile memory 109 (such as ROM, flash memory, etc.), or some combination of the two memory types. Additionally, device 101 may also have mass storage devices, such as a removable storage device 111, a non-removable storage device 113, or some combination of these two storage device types. The mass storage devices can be any device that can retrieve stored information, such as magnetic or optical disks or tape, punched media, or holographic storage. The system memory 105 and mass storage devices 111 and 113 are examples of computer storage media.

The device 101 may have one or more input devices 115 as well, such as a keyboard, microphone, scanner or pointing device, for receiving input from a user. The device 101 may also have one or more output devices 117 for outputting data to a user, such as a display, a speaker, printer or a tactile feedback device. Other components of the device 101 may include communication connections 119 to other devices, computers, networks, servers, etc. using either wired or wireless media. As will be appreciated by those of ordinary skill in the art, the communication connections 119 are examples of communication media. All of these devices and connections are well know in the art and thus will not be discussed at length here.

Use Of Polygons For Rendering Images

As will be appreciated by those of ordinary skill in the art, one form of output for the computing device 101 is the rendering of images on a display screen, such as a cathode ray tube (CRT) display, a liquid crystal display (LCD), a plasma display or an organic material display. For example, a user may employ the computing device 101 to implement a software program for receiving and storing pointing device data in the form of electronic ink. In addition to receiving and storing the pointing device data, the computing device 101 may also display images corresponding to the received pointing device data.

Figure 2:
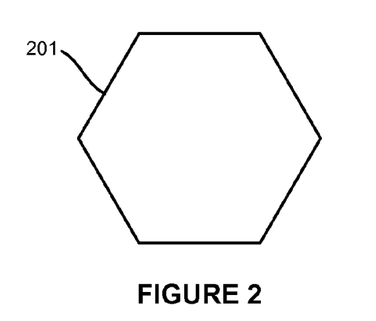
FIG. 2 shows an example of a convex polygon.
Figure 3:
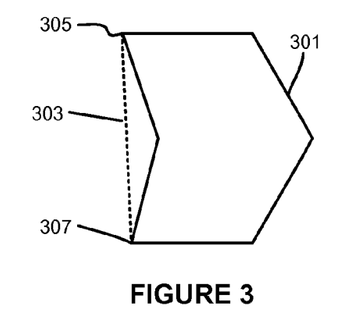
FIG. 3 shows an example of a polygon that is not convex.

While images rendered on a display by a computing device 101 may appear to have smooth curves, often the images are formed by polygons having straight edges rather than by curved lines. As shown in FIGS. 2 and 3, a polygon may be convex or concave. A polygon is convex if no two points on the perimeter of the polygon can be connected by a line that is not entirely contained within the polygon. Thus, the hexagon 201 shown in FIG. 2 is convex, because no two points on the perimeter of the polygon can be connected by a straight line without that line being contained entirely within the hexagon 201. The polygon 301 illustrated in FIG. 3, on the other hand, is not convex (that is, the polygon 301 is concave). As may be seen in this figure, a line 303 may connect the vertex 305 to the vertex 307 without passing through the polygon 301.

In order to render curved shapes to appear as smooth as possible, polygons forming an image are typically connected by straight lines that do not leave any "protruding" vertices of the polygons. More particularly, the polygons are typically connected by straight lines that enclose the polygons in the smallest amount of space to create a new convex polygon. This enclosed area formed by the connecting lines is often referred to as a "convex hull."

Figure 4:
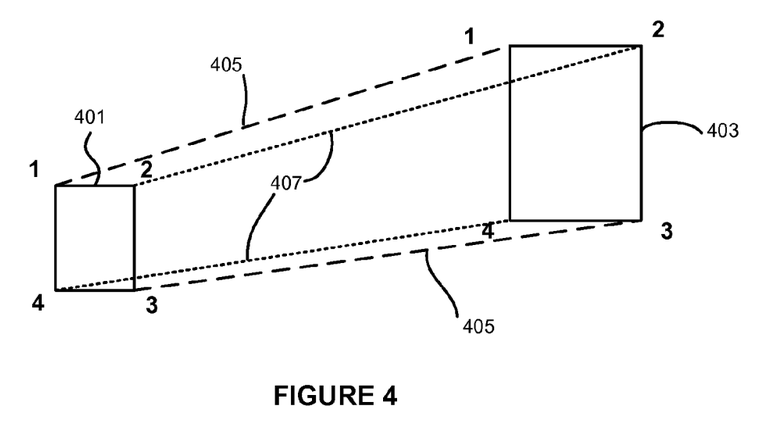
FIG. 4 shows a convex hull of two rectangles having the same orientation.

FIG. 4 illustrates two polygons 401 and 403. As seen in this figure, a straight line connects each vertex of the polygon 401 to a corresponding vertex of the polygon 403. A first line 405 thus connects the vertex 1 of the polygon 401 to the vertex 1 of the polygon 403. Likewise, a first line 407 connects the vertex 2 of the polygon 401 to the vertex 2 of the polygon 403, while a second line 405 connects the vertex 3 of the polygon 401 to the vertex 3 of the polygon 403. A second line 407 then connects the vertex 4 of the polygon 401 to the vertex 4 of the polygon 403. It should be noted, however, that the first line 407 connecting the vertex 2 of the polygon 401 to the vertex 2 of the polygon 403 does not enclose the vertex 1 of the polygon 403. Similarly, the second line 407 connecting the vertex 4 of the polygon 401 to the vertex 4 of the polygon 403 does not enclose the vertex 3 of the polygon 401. Accordingly, neither of lines 407 lies on the perimeter of the convex hull of the polygons 401 and 403. On the other hand, the area formed by connecting the polygons 401 and 403 by the lines 405 encompasses every vertex of both polygons 401 and 403 to form a convex shape. Thus, connecting the polygons 401 and 403 by the lines 405 forms the convex hull of the polygons.

As noted above, determining the convex hulls of two convex polygons is often useful for a variety of tasks relating to the rendering of images. Various techniques for rendering electronic ink, for example, may use the convex hull of two convex polygons having congruent corresponding angles with the same orientation. More particularly, with some techniques for rendering electronic ink, a user manipulates a pointing device, such as a stylus contacting a digitizing surface, to form a series of points. Depending upon the desired appearance of the electronic ink, each point may be rendered by a circle or a polygon. Thus, if the electronic ink is to have the appearance of ink created with a regular ball point pen or pencil, then each of the points may be rendered by a circle. If, however, the electronic ink is to have the appearance of ink written with a chisel-tipped pen, then each of the points may be rendered by a rectangle, such as an elongated rectangle or square.

Figure 5:
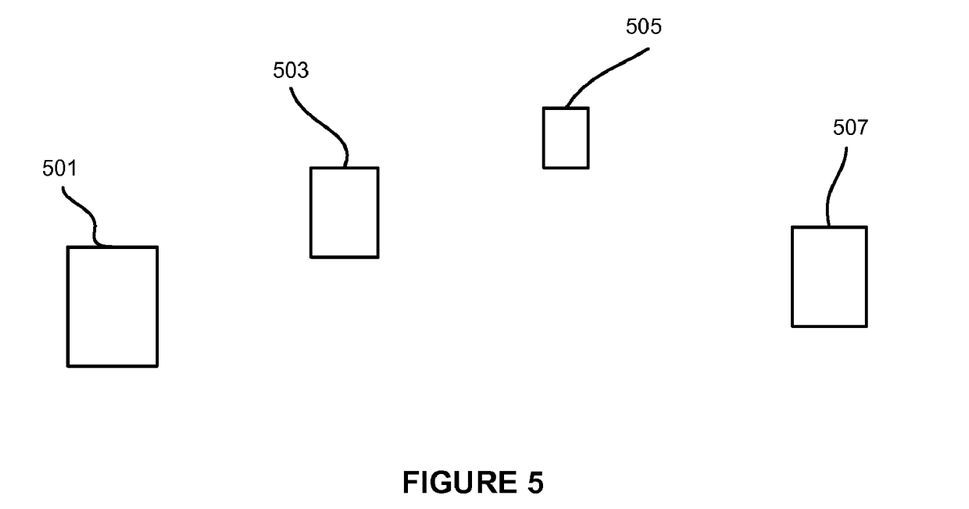
FIG. 5 shows multiple similar rectangles corresponding to an electronic ink stroke.

For example, FIG. 5 illustrates a group of rectangle polygons 501-507, each polygon corresponding to a point of the electronic ink formed by moving a stylus over a digitizing surface. With the illustrated polygons 501-507, the size of each polygon depends upon the pressure applied with stylus at the time when the point was created. Thus, the larger polygon 501 reflects a greater stylus pressure than the smaller polygon 505.

Figure 6:
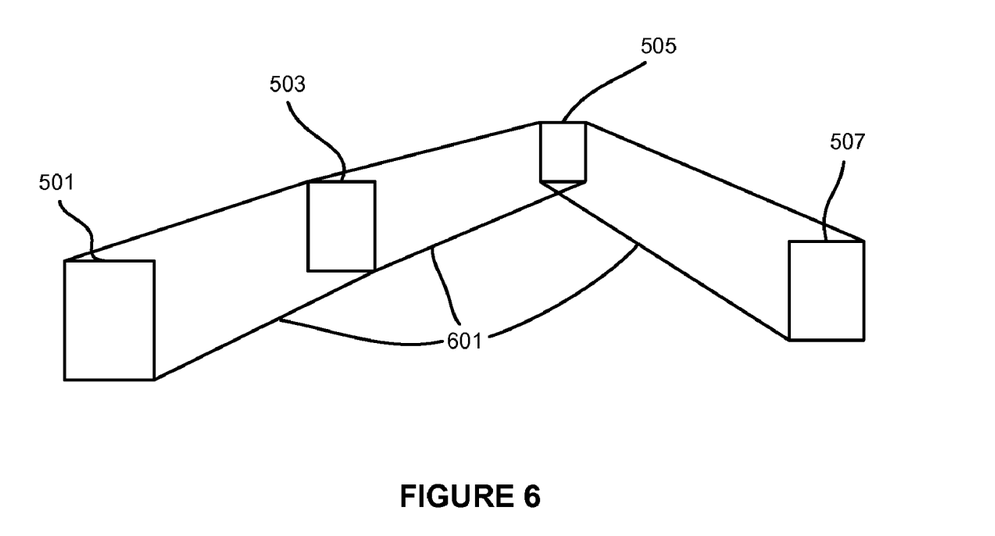
FIG. 6 shows how the electronic ink stroke of FIG. 5 may be rendered by forming the convex hull of the multiple rectangles having the same orientation.

In order to render the entire length of the electronic ink formed by the points represented by the polygons 501-507, a convex hull is determined for sequentially-formed polygons 501-507. More particular, for each polygon 501-507, a convex hull is determined that encompasses the polygon and the polygon formed immediately before it (or immediately after it). Thus, as shown in FIG. 6, lines 601 are determined that form convex hulls encompassing each of the polygons 501-507. The convex hulls are then rendered to display the entire length of the electronic ink. Moreover, because the convex hulls encompass the polygons 501-507 of different sizes, the rendered electronic ink displays differences in width corresponding to the amount of pressure applied by the stylus against the digitizing surface, just as real ink would show a difference in width corresponding to the amount of pressure applied by, for example, a felt-tip pen against paper.

Determining The Convex Hull For Similar Rectangles

Figure 7A:
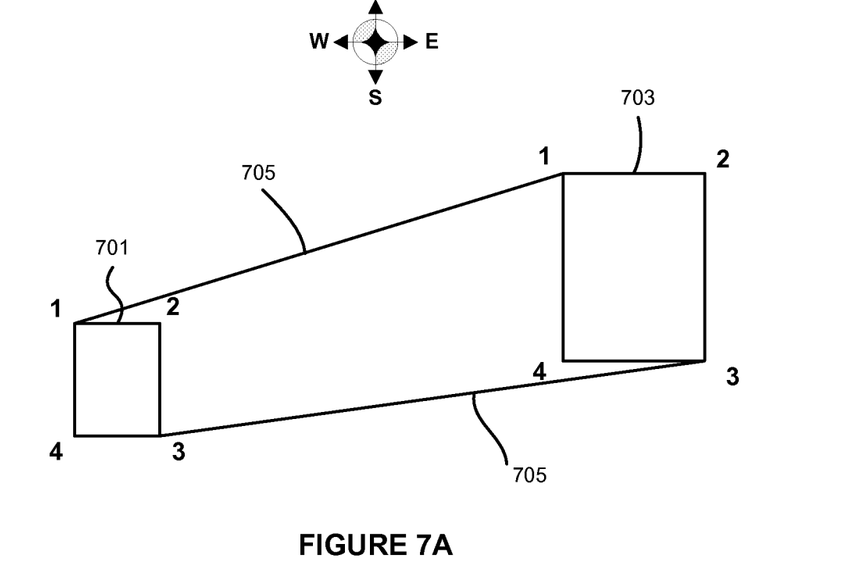
FIGS. 7A-7C illustrate three different possible relationships between rectangles having the same orientation.

As noted above, it is often very useful to determine the convex hulls of two rectangles. (As used herein, the term "rectangles" encompasses both elongated rectangles and squares.) FIG. 7A illustrates the relationship between two such rectangles 701 and 703. In this example, the rectangles 701 and 703 have the same orientation. That is, each vertex of the rectangle 701 can be exactly overlaid onto its corresponding vertex of the rectangle 703 without having to rotate either vertex. FIG. 7A also includes a compass alignment, to provide a context in which to more precisely describe the relationship between the rectangle 701 and the rectangle 703. As seen in this figure, the north-south direction of the compass alignment is parallel to the sides of the rectangles 701 and 703. Using this compass alignment, the rectangle 701 may be described as southwest of the rectangle 703, while the rectangle 703 may be described as northeast of the rectangle 701. That is, each vertex of the rectangle 701 is southwest of its corresponding vertex in the rectangle 703, while each vertex in the rectangle 703 is northeast of its corresponding vertex in the rectangle 703.

Thus, the northwestern-most vertex of the rectangle 701 (labeled as vertex 1) is southwest of the corresponding northwestern-most vertex of the rectangle 703 (also labeled as vertex 1). Alternately, vertex 1 of the rectangle 703 may be considered to be northeast of vertex 1 of the rectangle 701. Similarly, the northeastern-most vertex of rectangle 701 (labeled as vertex 2) is southwest of the corresponding northeastern-most vertex of the rectangle 703 (also labeled as vertex 2), while vertex 2 of the rectangle 703 is northeast of the corresponding vertex 2 of the rectangle 701. The southeastern-most vertex of the rectangle 701 (labeled as vertex 3) is also southwest of the corresponding southeastern-most vertex of rectangle 703 (labeled as a vertex 3 as well). Lastly, the southwestern-most vertex of the rectangle 701 (labeled as vertex 4) is southwest of the corresponding southwestern-most vertex of the rectangle 703 (also labeled as a vertex 4). The lines 705 then lay on the perimeter of the convex hull of the two rectangles 701 and 703.

Figure 7B:
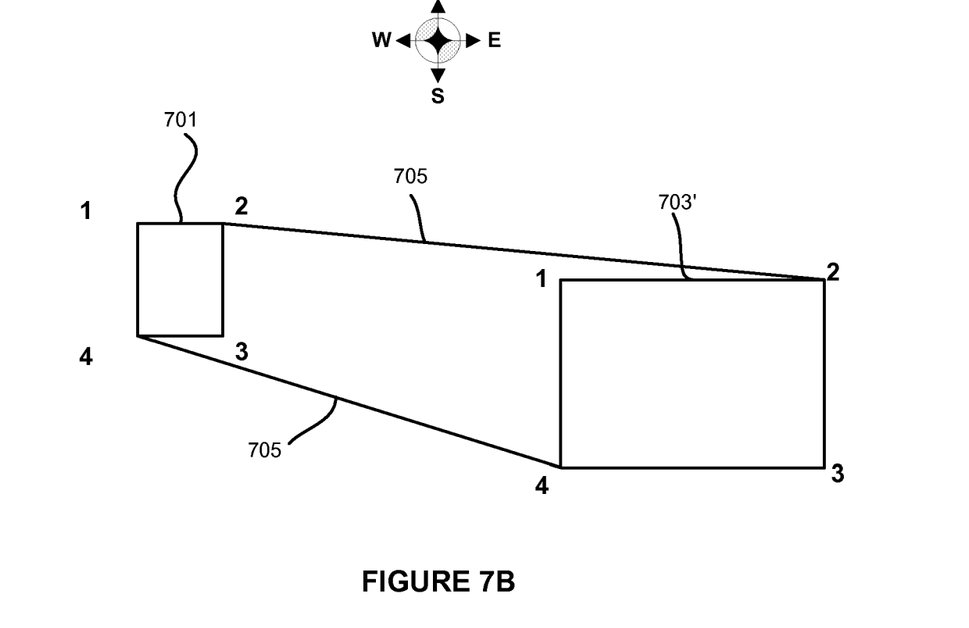

FIG. 7B illustrates a different relationship between rectangles 701 and 703'. As seen in this figure, the rectangle 703' is southeast of the rectangle 701, or, alternately stated, the rectangle 701 is northwest of the rectangle 703'. That is, each vertex in the rectangle 703' is southeast of its corresponding vertex in the rectangle 701, while each vertex in the rectangle 701 is northwest of its corresponding vertex in the rectangle 703'. As will be appreciated from this figure, when the rectangles 701 and 703 are in this relationship, the perimeter of the convex hull of these rectangles includes a first connecting line 705 connecting the vertex 2 of each rectangle, and a second connecting line 705 connecting the vertex 4 of each rectangle.

Figure 7C:
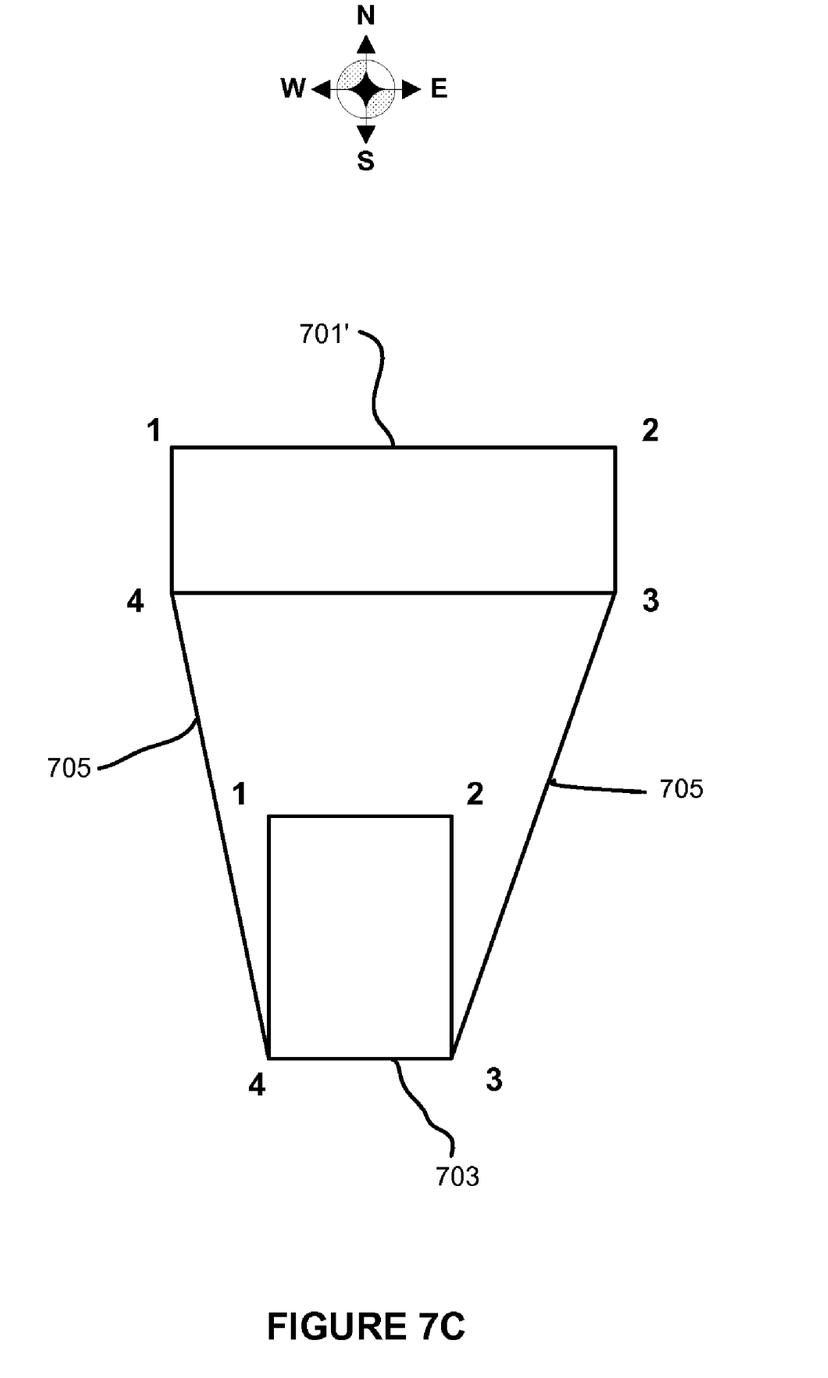

FIG. 7C illustrates still another relationship between rectangles 701' and 703. As seen in this figure, the rectangle 701' is north of the rectangle 703. More particularly, the northwestern-most vertex of the rectangle 701' (labeled as vertex 1) is northwest of the corresponding northwestern-most vertex of the rectangle 703 (also labeled as vertex 1). Alternately, vertex 1 of the rectangle 703 may be considered to be southeast of vertex 1 of the rectangle 701'. The northeastern-most vertex of rectangle 701' (labeled as vertex 2) is northeast of the corresponding northeastern-most vertex of the rectangle 703 (also labeled as vertex 2), while vertex 2 of the rectangle 703 is southwest of the corresponding vertex 2 of the rectangle 701'. The southeastern-most vertex of the rectangle 701' (labeled as vertex 3) is also northeast of the corresponding southeastern-most vertex of rectangle 703 (labeled as a vertex 3 as well). Alternately, vertex 3 of the rectangle 703 is southwest of the corresponding vertex 3 of the rectangle 701'.Lastly, the southwestern-most vertex of the rectangle 701' (labeled as vertex 4) is northwest of the corresponding southwestern-most vertex of the rectangle 703 (also labeled as a vertex 4), or, as may be alternately stated, vertex 4 of the rectangle 703 is southeast of its corresponding vertex 4 of the rectangle 701'.

As seen in these figures, when the northwestern-most vertex 1 of a rectangle is in a northeast-southwest relationship with the northwestern-most vertex 1 of another rectangle having the same orientation, then a line connecting the northwestern-most vertex 1 of the rectangle to the northwestern-most vertex of the other rectangle lies on the convex hull of the two rectangles. If, however, the northwestern-most vertex 1 of a rectangle is not in a northeast-southwest relationship with the northwestern-most vertex 1 of the other rectangle, then a line connecting the two vertices will not lay on the convex hull of the two rectangles. Similarly, when the southeastern-most vertex 3 of a rectangle is in a northeast-southwest relationship with the southeastern-most vertex 3 of another rectangle having the same orientation, then a line connecting the southeastern-most vertex 3 of the rectangle to the southeastern-most vertex of the other rectangle lies on the convex hull of the two rectangles. If the southeastern-most vertex 3 of a rectangle is not in a northeast-southwest relationship with the southeastern-most vertex 3 of the other rectangle, then a line connecting the two vertices will not lay on the convex hull of the two rectangles.

It will also be noted from FIGS. 7A-7C that, when the northeastern-most vertex 2 of a rectangle is in a northwest-southeast relationship with the northeastern-most vertex 2 of another rectangle having the same orientation, then a line connecting the northeastern-most vertex 2 of the rectangle to the northeastern-most vertex 2 of the other rectangle lies on the convex hull of the two rectangles. If, however, the northeastern-most vertex 2 of a rectangle is not in a northwest-southeast relationship with the northeastern-most vertex 2 of the other rectangle, then a line connecting the two vertices will not lay on the convex hull of the two rectangles. Similarly, when the southwestern-most vertex 4 of a rectangle is in a northwest-southeast relationship with the southwestern-most vertex 4 of another rectangle having the same orientation, then a line connecting the southwestern-most vertex 4 of the rectangle to the southwestern-most vertex of the other rectangle lies on the convex hull of the two rectangles. If the southwestern-most vertex 4 of a rectangle is not in a northwest- southeast relationship with the southwestern-most vertex 4 of the other rectangle, then a line connecting the two vertices will not lay on the convex hull of the two rectangles.

Figure 8:
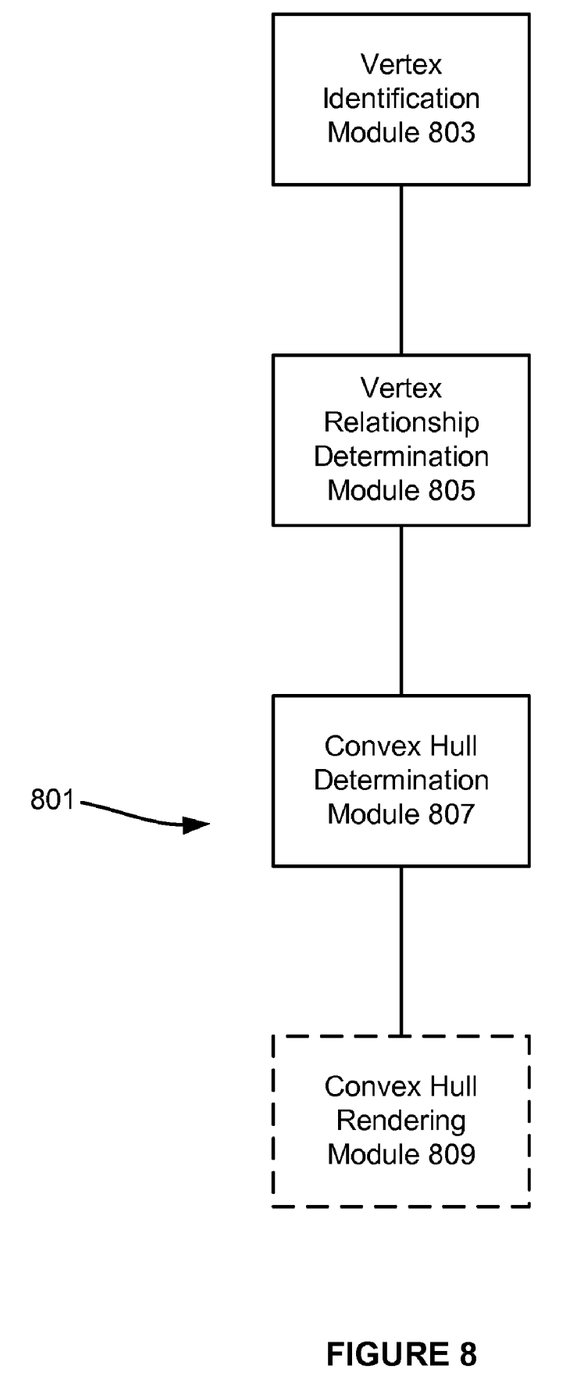
FIG. 8 shows a tool for determining a convex hull of two convex polygons having congruent corresponding angles with the same orientation.

As will now be described, these relationships may be used by various embodiments of the invention to determine the convex hull of two rectangles having a same orientation. FIG. 8 illustrates a tool 801 for determining the convex hull of two similar polygons having the same orientation, such as the similar rectangles 701 and 703 illustrated in FIGS. 7A and 7B. The tool 801 includes a vertex identification module 803, a vertex relationship determination module 805, and a convex hull determination module 807. The tool 801 may also optionally include a convex hull rendering module 809. The operation of the tool 801 in determining the convex hull of two rectangles having the same orientation, such as rectangles 701 and 703, will be described in more detail with reference to FIG. 9.

Figure 9:
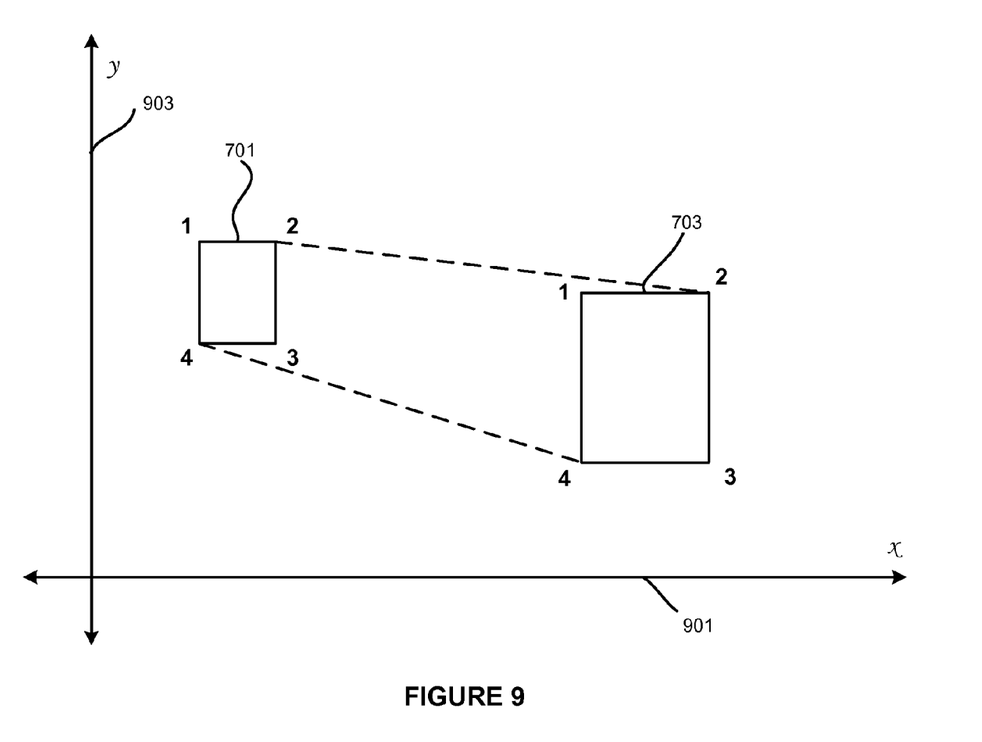
FIG. 9 illustrates features of one technique for determining a convex hull of two rectangles having the same orientation.

To begin the process of determining the convex hull of two similar rectangles having the same orientation, the vertex identification module 803 first identifies the vertices of each of the rectangles. For example, as illustrated in FIG. 9, the vertex identification module 803 may identify each vertex of each rectangle according to Cartesian coordinates defined by an x-direction axis 901 parallel to the sides of the rectangles and a y-direction axis 903 parallel to the tops and bottoms of the rectangles. As will be appreciated by those of ordinary skill in the art, Cartesian coordinates may be used to define any point in a two-dimensional area with a single coordinate value along the x-direction axis 901 and a single coordinate value along the y-direction axis 903. Thus, each vertex of rectangle 701 and each vertex of rectangle 703 may be defined by a single pair of "x" and "y" coordinate values. With various embodiments of the invention, the x-direction axis 901 may or may not include negative values. Similarly, with various embodiments of the invention, the y-direction axis 903 may or may not include negative values.

Accordingly, the vertex identification module 803 may employ the Cartesian coordinates of the vertices to identify each vertex of a rectangle and its corresponding vertex in the other rectangle. The vertex identification module 803 may, for example, identify the vertex of the rectangle 701 having the highest "y" coordinate value and the lowest "x" coordinate value as vertex 1 of the rectangle 701. The vertex identification module 803 may then identify the vertex of rectangle 703 having the highest "y" coordinate value and the lowest "x" coordinate value as the corresponding vertex 1 of the rectangle 703. Similarly, the vertex identification module 803 may then identify the vertex of the rectangle 701 having the highest "y" coordinate value and the highest "x" coordinate value as vertex 2 of the rectangle 701, and identify the vertex of the rectangle 703 having the highest "x" coordinate and value and the highest "y" coordinate value as the corresponding vertex 2 of the rectangle 703.

As shown in FIG. 9, the vertex identification module 803 may then identify the vertex of the rectangle 701 having the lowest "y" coordinate value and the highest "x" coordinate value as vertex 3 of the rectangle 701, and identify the vertex of the rectangle 703 having the lowest "y" coordinate value and the highest "x" coordinate value as the corresponding vertex 3 of the rectangle 703. Lastly, the vertex identification module 803 may identify the vertex of the rectangle 701 having both the lowest "y" coordinate value and the lowest "x" coordinate value as vertex 4 of the rectangle 701. The vertex identification module 803 may then identify the vertex of the rectangle 703 having both the lowest "y" coordinate value and the lowest "x" coordinate value as the corresponding vertex 4 of the rectangle 703.

Thus, the vertex identification module 803 identifies each vertex of each rectangle, and further identifies the corresponding pairs of vertices in each rectangle. It should be noted, however, that while each vertex in FIG. 9 is labeled with a number from 1 through 4, any technique may be employed to identify corresponding vertices in the rectangles. For example, the x and y coordinate values of vertices may be designated as corresponding by storing the coordinates together in a predetermined memory location, rather than identifying each vertex with a matching identifying label.

Once the vertex identification module 803 has identified each vertex, the vertex relationship determination module 805 determines the relationship between the corresponding vertices in each rectangle. More particularly, the vertex relationship determination module 805 determines whether the vertices in each pair of corresponding vertices are in a northeast-southwest relationship or in a northwest-southeast relationship. According to various embodiments of the invention, the vertex relationship determination module 805 may employ the Cartesian coordinates for a pair of corresponding vertices to determine the relationship between the rectangles. More particularly, the vertex relationship determination module 805 may obtain the differences in the x-coordinate and y-coordinate values between any of the corresponding vertices of the rectangles to determine the relationship between the rectangles.

For example, with the rectangles 701 and 703 illustrated in FIGS. 7A-7C, the vertex relationship determination module 805 may obtain the difference between the x-coordinate value for the vertex 1 of the rectangle 701 and the x-coordinate value for the vertex 1 of the rectangle 703. The vertex relationship determination module 805 may then also obtain the difference between the y-coordinate value for the vertex 1 of the rectangle 701 and the y-coordinate value for the vertex 1 of the rectangle 703. If the difference in the x-coordinate values and the y-coordinate values share the same sign (that is, if the x-coordinate value difference and the y-coordinate value difference are both positive or are both negative), then the rectangles have a northeast-southwest relationship.

Thus, referring now to FIG. 7A, based upon the Cartesian coordinate system of FIG. 9, the x-coordinate value of vertex 1 of the rectangle 703 has a higher value than the x-coordinate value of vertex 1 of the rectangle 701. The x-coordinate value difference therefore will be positive. Similarly, the y-coordinate value of vertex 1 of the rectangle 703 has a higher value than the y-coordinate value of vertex 1 of the rectangle 701, so the y-coordinate value difference will be positive as well. Accordingly, the vertices 1 of rectangles 701 and 703 shown in FIG. 7A are in a northeast-southwest relationship.

On the other hand, if the differences in the x-coordinate values and the y-coordinate values have different signs (that is, if the x-coordinate value difference is positive and the y-coordinate value difference is negative, or if the x-coordinate value difference is negative and the y-coordinate value difference is positive), then the rectangles have a southeast-northwest relationship. For example, referring now to FIG. 7B, the x-coordinate value of vertex 1 of the rectangle 703' has a higher value than the x-coordinate value of vertex 1 of the rectangle 701, so the x-coordinate value difference will be positive. The y-coordinate value of vertex 1 of the rectangle 703' has a lower value than the y-coordinate value of vertex 1 of the rectangle 701, however, so the y-coordinate value difference will be negative.

While the above example considered only vertex 1 of the rectangle 701 and the corresponding vertex 1 of the rectangle 703, it should be appreciated that the relationship between the rectangles may be obtained by comparing the difference in the x-coordinate values for a pair of corresponding vertices with the difference in the y-coordinate values of the same pair of corresponding vertices for each pair of corresponding vertices. By examining each pair of corresponding vertices, the vertex relationship determination module 805 vertex relationship determination module 805 can accurately determine the convex hull of the rectangles.

More particularly, when the vertex relationship determination module 805 determines that the x-coordinate value difference and the y-coordinate value difference for the corresponding vertices with both the highest x-coordinate value and the highest y-coordinate value have different signs, then the convex hull determination module 807 determines that the perimeter of the convex hull of the rectangles includes a line connecting these vertices. If, however, the convex hull determination module 807 determines that the x-coordinate and y-coordinate differences for these vertices have the same sign, then the convex hull determination module 807 determines that the line connecting these vertices will not lay on the perimeter of the convex hull of the rectangles.

Similarly, when the vertex relationship determination module 805 determines that the x-coordinate value difference and the y-coordinate value difference for the corresponding vertices with both the lowest x-coordinate value and the lowest y-coordinate value have different signs, then the convex hull determination module 807 determines that the perimeter of the convex hull of the rectangles includes a line connecting these vertices. If, however, the convex hull determination module 807 determines that the x-coordinate and y-coordinate differences for these vertices have the same sign, then the convex hull determination module 807 determines that the line connecting these vertices will not lay on the perimeter of the convex hull of the rectangles.

When the vertex relationship determination module 805 determines that the x-coordinate value difference and the y-coordinate value difference for the corresponding vertices with the highest x-coordinate value and the lowest y-coordinate value have the same signs, then the convex hull determination module 807 determines that the perimeter of the convex hull of the rectangles includes a line connecting these vertices. If, however, the convex hull determination module 807 determines that the x-coordinate and y-coordinate differences for these vertices have different signs, then the convex hull determination module 807 determines that the line connecting these vertices will not lay on the perimeter of the convex hull of the rectangles.

Further, if the vertex relationship determination module 805 determines that the x-coordinate value difference and the y-coordinate value difference for the corresponding vertices with the lowest x-coordinate value and the highest y-coordinate value have the same signs, then the convex hull determination module 807 determines that the perimeter of the convex hull of the rectangles includes a line connecting these vertices. If, however, the convex hull determination module 807 determines that the x-coordinate and y-coordinate differences for these vertices have different signs, then the convex hull determination module 807 determines that the line connecting these vertices will not lay on the perimeter of the convex hull of the rectangles.

It should be noted that, in some situations, the x-coordinate difference or the y-coordinate difference may be zero. The zero value may be treated as either positive or negative. As long as this value of zero is consistently assigned a positive or negative sign, the convex hull determination module 807 can determine all of the connecting lines between corresponding vertices that lay on the perimeter of the convex hull.

Once the convex hull determination module 807 determines the two connecting lines forming the perimeter of the convex hull of the rectangles, it then can determine the entire perimeter of the convex hull. More particularly, the convex hull determination module 807 may select a single vertex that will always be included in the convex hull perimeter. For example, the convex hull determination module 807 may select one of the vertices in a rectangle that is connected to its corresponding vertex in the other rectangle by the perimeter of the convex hull. By traveling along any connecting lines in a consistent direction (that is, either clockwise or counterclockwise), the convex hull determination module 807 will travel along the lines forming the perimeter of the convex hull.

Thus, referring to FIG. 7A, if the convex hull determination module 807 begins at vertex 3 of rectangle 703, it may travel in a clockwise direction along the lower connecting line 705 to the vertex 3 of rectangle 701 (rather than along the line connecting vertex 3 of rectangle 703 to vertex 4 of rectangle 703). Using this technique, the convex hull determination module 807 will then travel to vertex 4 of rectangle 701, from there up to vertex 1, and then along the upper connecting line 705 to vertex 1 of the rectangle 703. From vertex 1 of the rectangle 703, the convex hull determination module 807 will travel to vertex 2 of the rectangle 703, and then return to vertex 3 of the rectangle 703. In this manner, the convex hull determination module 807 can define the perimeter of the convex hull of the rectangles. Of course, still other techniques may be employed to define the entirety of the perimeter of the convex hull after the connecting lines between the rectangles have been determined. Once the convex hull determination module 807 has defined the perimeter of the convex hull of the two rectangles, then the convex hull rendering module 807 may render the defined convex hull on a display.

Determining The Convex Hull For All Types Of Convex Polygons

While the various embodiments of the invention described above provide fast and efficient techniques for determining the convex hull of two similar rectangles having the same orientation, it is often useful to determine the convex hull of a variety of types of convex polygons. Advantageously, various aspects of the invention provide techniques for determining the convex hull of any pair of convex polygons having congruent corresponding angles with the same orientation. Two convex polygons have congruent corresponding angles when the angle of each vertex in one of the polygons is the same as the angle of the corresponding vertex in the other polygon. Moreover, the angles of two polygons have the same orientation when each vertex of one of the polygons can be exactly overlaid onto the vertex of the other polygon without having to rotate the vertex (that is, by only moving the vertex up, down, left or right).

Figure 10:
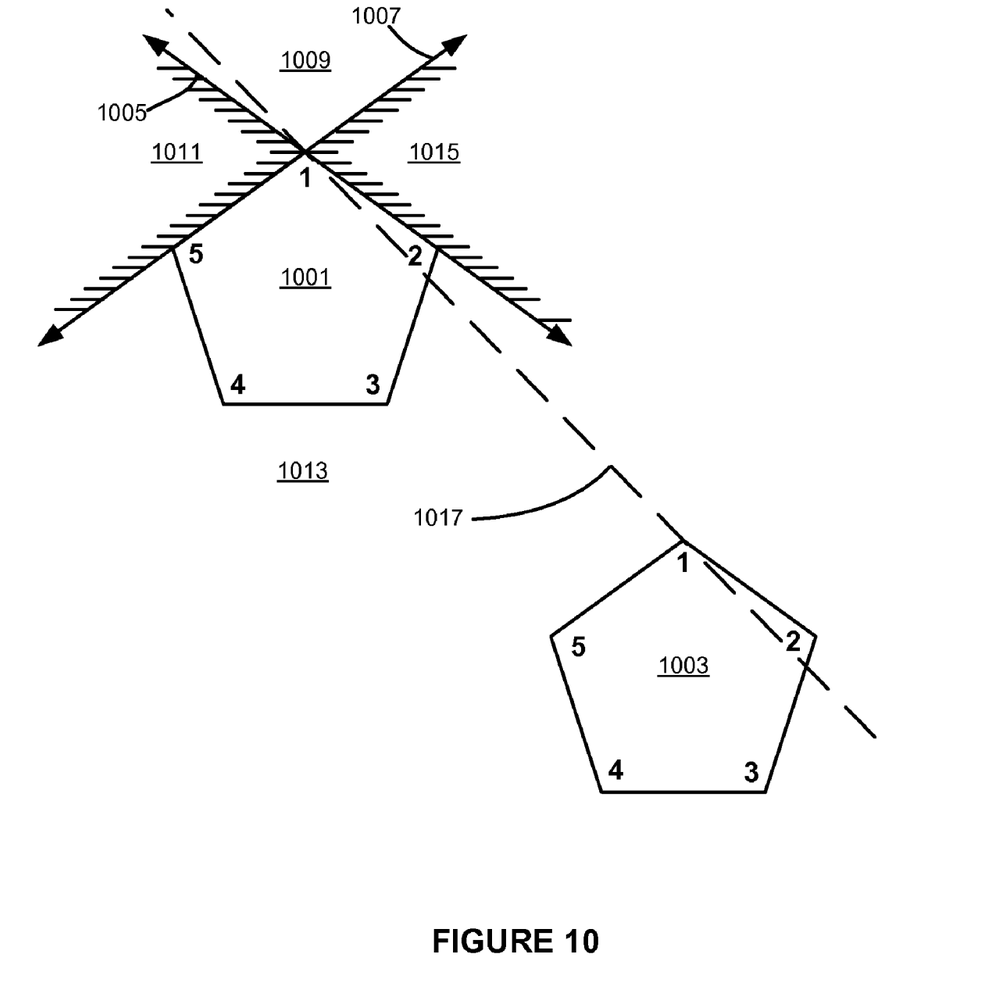
FIGS. 10-12 illustrate three different possible relationships between convex polygons having congruent corresponding angles with the same orientation.

Referring now to FIG. 10, this figure illustrates one possible relationship between two similar pentagons having the same orientation. As seen in this figure, the pentagon 1001 has five vertices labeled sequentially with numbers 1-5. The pentagon 1003 also has five vertices labeled sequentially with numbers 1-5. As will be apparent from this figure, vertex 1 of the pentagon 1001 corresponds to vertex 1 of the pentagon 1003, and the angle of vertex 1 of the pentagon 1001 forms the same angle and has the same orientation as vertex 1 of the pentagon 1003. Similarly, vertex 2 of the pentagon 1001 corresponds to vertex 2 of the pentagon 1003, and the angle of vertex 2 of the pentagon 1001 forms the same angle and has the same orientation as vertex 2 of the pentagon 1003. Likewise, vertex 3 of the pentagon 1001 corresponds to vertex 3 of the pentagon 1003, and the angle of vertex 3 of the pentagon 1001 forms the same angle and has the same orientation as vertex 3 of the pentagon 1003. Vertex 4 of the pentagon 1001 then corresponds to vertex 4 of the pentagon 1003, and the angle of vertex 4 of the pentagon 1001 forms the same angle and has the same orientation as vertex 4 of the pentagon 1003. Lastly, vertex 5 of the pentagon 1001 corresponds to vertex 5 of the pentagon 1003, and the angle of vertex 5 of the pentagon 1001 forms the same angle and has the same orientation as vertex 5 of the pentagon 1003.

Turning now to vertex 1 of the pentagon 1001 in more detail, the polygon segments forming vertex 1 may be extended to define four regions. More particularly, the line segment connecting vertex 1 to vertex 2 may be extended to form a line 1005. The line segment connecting vertex 1 to vertex 5 similarly may be extended to form a line 1007. Together, the intersection of lines 1005 and 1007 define four regions: 1009, 1011, 1013 and 1015. As will be discussed in further detail, the perimeter of the convex hull of the two polygons will only contain a line connecting vertex 1 of the pentagon 1001 with the corresponding vertex 1 of the pentagon 1003 if vertex 1 of the pentagon 1003 falls within the region 1011 or the region 1015. If vertex 1 of the pentagon 1003 instead falls within the region 1009 or the region 1013, then the convex hull will not include a line connecting vertex 1 of pentagon 1001 with its corresponding vertex 1 of pentagon 1003.

As shown in FIG. 10, vertex 1 of pentagon 1003 does not lie within either of region 1011 or region 1015. Instead, vertex 1 of the pentagon 1003 falls within region 1013. A straight line 1017 connecting vertex 1 of the pentagon 1001 to vertex 1 of the pentagon 1003 thus passes between vertices 3-5 and vertex 2 of the pentagon 1001. Thus, a polygon that included the line 1017 would allow vertex 2 of the pentagon 1001 to "protrude" from its perimeter, making the polygon concave. The line 1017 therefore cannot be included in the perimeter of the convex hull of pentagons 1001 and 1003.

Figure 11:
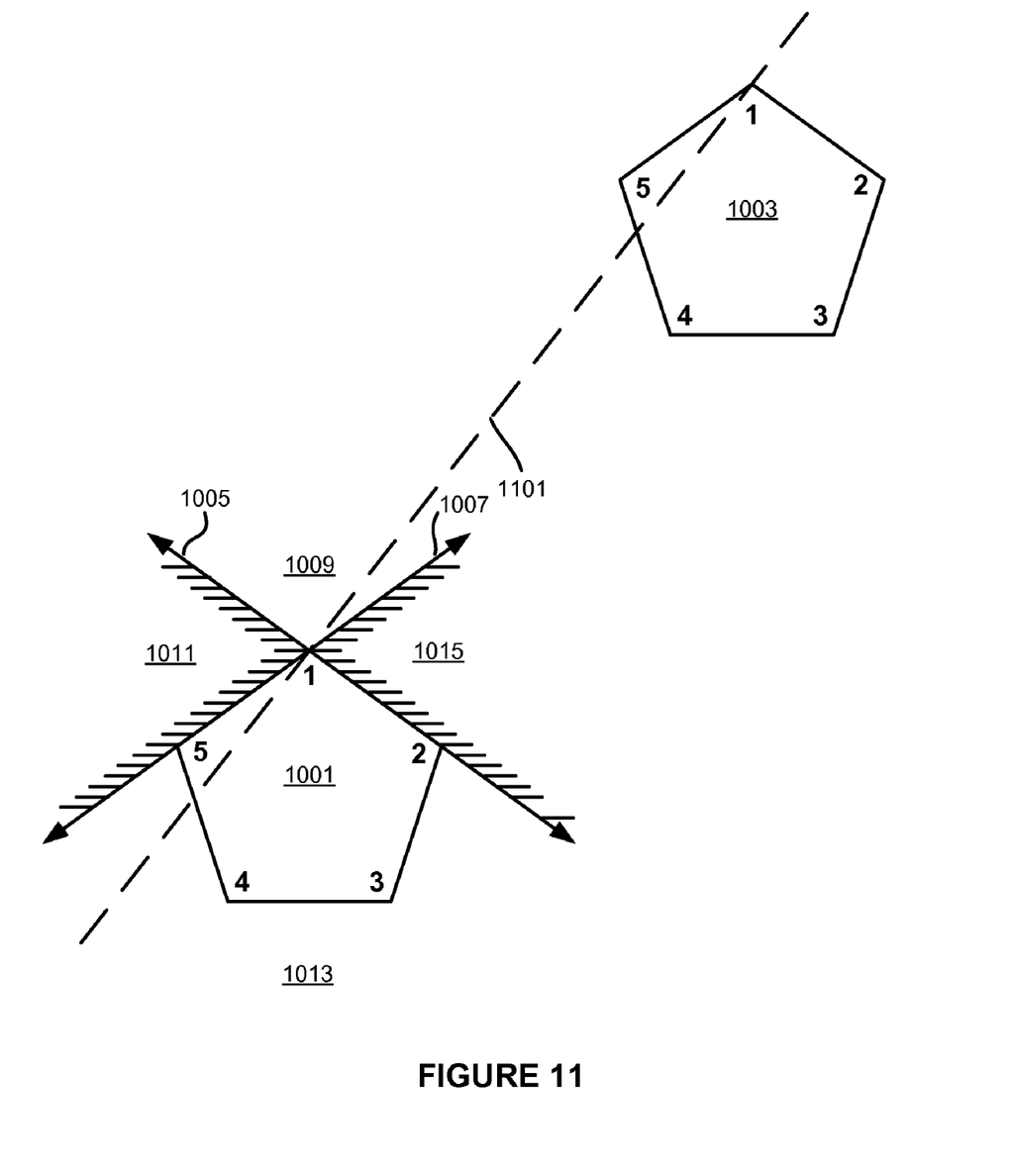

Turning now to FIG. 11, in this figure vertex 1 of pentagon 1003 also does not lie within either of region 1011 or region 1015, but instead falls within region 1009. Accordingly, a straight line 1101 connecting vertex 1 of the pentagon 1001 to vertex 1 of the pentagon 1003, if extended, would still pass between vertices 2-4 and vertex 5 of the pentagon 1001. A polygon that included the line 1101 therefore would allow vertex 5 of the pentagon 1001 to "protrude" from its perimeter so as to make the polygon concave. The line 1101 therefore also cannot be included in the perimeter of the convex hull of pentagons 1001 and 1003.

Figure 12:
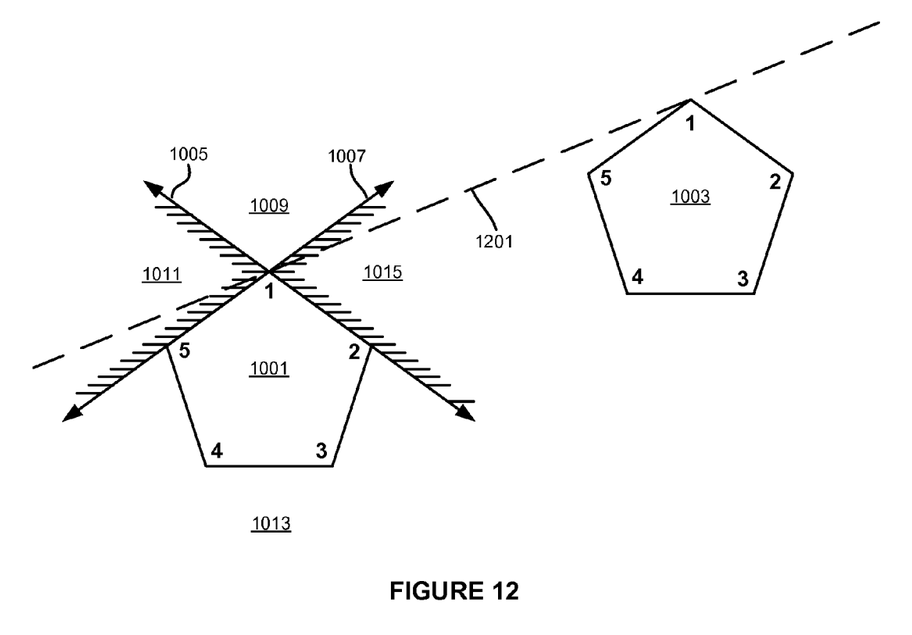

In FIG. 12, vertex 1 of pentagon 1003 does lay within the region 1015. Thus, a polygon that included the line 1201 connecting vertex 1 of the pentagon 1001 to vertex 1 of the pentagon 1003 would not allow either vertex 2 or vertex 5 to protrude from its perimeter. Rather, the vertices 2 and 5 adjacent to the connected vertex 1 both fall on the same side of the line 1201, so that a polygon including the polygon 1001, the polygon 1003 and the line 1201 would be convex. The line 1201 therefore should be included in the perimeter of the convex hull of pentagons 1001 and 1003.

From the above examples, it should be noted that a line passing through two corresponding vertices will determine if the vertices may be connected to form the perimeter of a convex. If a line extending from one vertex through its corresponding vertex splits the vertices adjacent to its corresponding vertex (as shown in FIGS. 10 and 11), then the corresponding vertices should not be connected to form the perimeter of a convex hull. If however, both adjacent vertices fall on the same side of a line extended through corresponding vertices (as shown in FIG. 12), then a line connecting the two vertices can form a portion of the perimeter of the convex hull of the two polygons. Accordingly, when various embodiments of the tool 801 are employed to determine the convex hull of two similar convex polygons having the same orientation, these embodiments of the tool 801 may use lines passing through each pair of corresponding vertices to determine which vertices should be connected to form the convex hull of the two polygons.

More particularly, the vertex identification module 803 will identify the vertices of each polygon. Further, the vertex identification module 803 will identify pairs of corresponding vertices between the polygons. For example, the vertex identification module 803 may identify each vertex in one of the polygons as vertex A(k), such that the value of k will range from 1 to N where N is the total number of vertices in the polygon. The vertex identification module 803 may then also identify each vertex in the other polygon as vertex B(k), where the vertex B(k) in the second polygon corresponds to vertex A(k) in the first polygon.

Next, the vertex relationship determination module 805 will examine the relationship between each pair of corresponding vertices. For example, the vertex relationship determination module 805 may define a line extending through both a selected vertex on one of the polygons and its corresponding vertex on the other polygon. That is, the vertex relationship determination module 805 may define a line extending through both vertex A(k) and vertex B(k). If the vertices adjacent to the selected vertex both fall on the same side of the line, then the convex hull determination module 807 determines that a connecting line connecting the vertices may be included in the perimeter of the convex hull of the two polygons. More particularly, if both the vertices A(k−1) and A(k+1) (or, alternately, both the vertices B(k−1) and B(k+1) fall on the same side of the line, then the convex hull determination module 807 determines that a connecting line connecting the vertices A(k) and B(k) may be included in the perimeter of the convex hull of the two polygons.

If, on the other hand, the vertices adjacent to the selected vertex are located on different sides of the line, then the vertices are not connected to form the convex hull. That is, if the vertices A(k−1) and A(k+1) (or, alternately, the vertices B(k−1) and B(k+1) fall on the different sides of the line, then the convex hull determination module 807 determines that a line connecting the vertices A(k) and B(k) will not be included in the perimeter of the convex hull of the two polygons. Thus, the vertex relationship determination module 805 examines a line extending through each pair of corresponding vertices for the two polygons, and the convex hull determination module 807 then determines, based upon the position of the vertices adjacent to the selected vertex, whether the selected vertex and its corresponding vertex should be connected.

It should be noted that, in some arrangements, one or both of the vertices adjacent to the selected vertex (that is, A(k−1), A(k+1) or both) may actually lie on the line extending through the selected vertex and its corresponding vertex in the second polygon. An adjacent vertex falling on the extending line may either be considered "above" the line or "below" the line. As long as the treatment of an adjacent vertex falling on the extending line is consistently used for all vertices, the convex hull determination module 807 will be able to determine if a line connecting the selected vertex in the first polygon to its corresponding vertex in the second polygon will lay on the convex hull of the polygons.

In this manner, the vertex relationship determination module 805 and the convex hull determination module 807 identify all possible corresponding vertices pairs that can be connected to form the convex hull. Once the lines connecting the vertices pairs have been determined, the convex hull determination module 807 may travel along the perimeter of the polygons and the connecting lines as described in detail above to determine the perimeter of the convex hull. The convex hull rendering module 809 may then render the convex hull defined by the convex hull determination module 807.

Convex Hulls With More Or Less Than Two Connecting Lines

Typically, two similar convex polygons having congruent corresponding angles with the same orientation will have only two lines connecting corresponding vertices to form the convex hull of the polygons. In some situations, however, the tool 801 may be unable to identify even a single line in the convex hull perimeter that connects corresponding vertices of the polygons. When this occurs, at least in some instance, one of the polygons encompasses the other polygon entirely. Accordingly, the convex hull determination module 807 will determine which of the polygons encompasses the other. Various techniques for making this determination are well known in the art, and thus will not be described in further detail here. Once the encompassing polygon is identified, the convex hull determination module 807 can then designate that encompassing polygon as the convex hull of both polygons. In still other situations, the tool 801 may identify three or more connecting lines between the two polygons, where the connected vertices of each polygon are adjacent. For example, the tool 801 may determine that each of vertices 1, 2 and 3 of two rectangles, such as the rectangles 701 and 703 of FIGS. 7A and 7B, should be connected, rather than vertices 1 and 3 or vertices 2 and 4. This situation occurs, for example, when at least one side of each polygon falls on the same line (e.g., a horizontal or vertical line). For example, if both of the vertices defining one side of a first polygon shared the same x-coordinate value as both of the vertices defining the corresponding side of the second polygon, then tool 801 may identify three or more connecting lines between the polygons. When this occurs, the tool 801 may simply disregard one of two connecting lines connecting adjacent vertices. More particularly, the tool 801 may arrange each pair of connected vertices in sequence, and simply ignore the connecting line for every other pair of vertices in the list.

For example, the tool 801 may determine that the convex hull of two identical rectangles (such as the rectangles 701 and 703 shown in FIGS. 7A-7C) that are side-by-side should include a first connecting line connecting the corresponding vertices 1, a second connecting line connecting the corresponding vertices 2, a third connecting line connecting the corresponding vertices 3, and a fourth connecting line connecting the corresponding vertices 4. In this situation, the tool 801 may determine that the convex hull includes only the connecting lines connecting the vertices 1 and 3, and disregard the connecting lines connecting the vertices 2 and 4. Alternately, the tool 801 may determine that the convex hull includes only the connecting lines connecting the vertices 2 and 4, and disregard the connecting lines connecting the vertices 1 and 3. In these situations, the use of either connecting line connecting two adjacent vertices will accurately produce the convex hull of the polygons.

Conclusion

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. An apparatus for determining a convex hull of a convex hull formed by two convex polygons having congruent corresponding angles with the same orientation, comprising:
    a processing unit;
    memory for storing computer executable instructions;
    a vertex identification module that identifies each vertex of a first convex polygon in series about a perimeter of the first convex polygon;
    a line connection module that, for each vertex in the first convex polygon,
        identifies a corresponding vertex in a second convex polygon, each angle in the second convex polygon being congruent to a corresponding angle in the first convex polygon and oriented in a same direction as the corresponding angle in the first convex polygon;
        defines a line between the vertex in the first convex polygon and the corresponding vertex in the second convex polygon;
        determines if both an immediately preceding vertex and an immediately subsequent vertex both fall on a same side of the defined line; and
        if both the immediately preceding vertex and the immediately subsequent vertex fall on the same side of the defined line, determines that a line connecting the vertex in the first polygon to the corresponding vertex in the second polygon lies on perimeter of a convex hull of the polygons; and
    a convex hull determination module that determines the convex hull to be portions of each of the first convex polygon and the second convex polygon connected by two of the determined connecting lines, such that the two of the determined connecting lines are connected to different vertices of the first convex polygon and the second convex polygon.

2. The apparatus recited in claim 1, wherein:
the line connection module determines that if no connecting lines are determined between the first convex polygon and the second convex polygon, the first convex polygon encloses the second convex polygon or that the second convex polygon encloses the first convex polygon.

3. The apparatus recited in claim 1, wherein:
the convex hull determination module determines the portion of the first convex polygon forming the convex hull and the portion of the second convex polygon forming the convex hull.

4. The apparatus recited in claim 1, further comprising a display, wherein the convex hull determination module renders the convex hull on the display.

5. The apparatus recited in claim 4, wherein the apparatus is configured to accept pointing device data in the form of electronic ink so as to generate convex polygons in response to user input.

6. The apparatus recited in claim 5, wherein the apparatus is configured to vary a size of a received polygon in response to variations in pressure of the user input.

* * * * *